(12) United States Patent
Mizukami et al.

(10) Patent No.: US 10,408,358 B2
(45) Date of Patent: Sep. 10, 2019

(54) LOAD SENSING VALVE DEVICE

(71) Applicant: KYB Corporation, Tokyo (JP)

(72) Inventors: Shota Mizukami, Kanagawa (JP);
Takeshi Terao, Kanagawa (JP); Akio Matsuura, Kanagawa (JP)

(73) Assignee: KYB Corporation, Tokyo (JP)

( * ) Notice: Subject to any disclaimer, the term of this patent is extended or adjusted under 35 U.S.C. 154(b) by 75 days.

(21) Appl. No.: 15/518,821

(22) PCT Filed: Oct. 27, 2015

(86) PCT No.: PCT/JP2015/080276
§ 371 (c)(1),
(2) Date: Apr. 13, 2017

(87) PCT Pub. No.: WO2016/072322
PCT Pub. Date: May 12, 2016

(65) Prior Publication Data
US 2017/0241555 A1    Aug. 24, 2017

(30) Foreign Application Priority Data

Nov. 7, 2014 (JP) .................................. 2014-227154

(51) Int. Cl.
*F16K 11/07* (2006.01)
*F15B 13/04* (2006.01)
*F15B 13/02* (2006.01)

(52) U.S. Cl.
CPC .......... *F16K 11/0716* (2013.01); *F15B 13/02* (2013.01); *F15B 13/0402* (2013.01); *F15B 13/0417* (2013.01); *F15B 2211/30555* (2013.01); *F15B 2211/3144* (2013.01); *F15B 2211/329* (2013.01); *F15B 2211/6051* (2013.01); *F15B 2211/651* (2013.01)

(58) Field of Classification Search
CPC .. F16K 11/0716; F15B 13/0402; F15B 13/02; Y10T 137/86574
See application file for complete search history.

(56) References Cited

U.S. PATENT DOCUMENTS

| | | | | |
|---|---|---|---|---|
| 3,881,512 A | * | 5/1975 | Wilke | F15B 11/16 137/596.13 |
| 5,161,373 A | * | 11/1992 | Morikawa | F15B 11/163 60/484 |
| 7,182,097 B2 | * | 2/2007 | Busani | F15B 13/01 137/596 |

FOREIGN PATENT DOCUMENTS

| | | |
|---|---|---|
| CN | 102865386 A | 1/2013 |
| JP | S60-095272 U | 6/1985 |
| JP | H09100805 A | 4/1997 |
| JP | 2009-204086 A | 9/2009 |

* cited by examiner

*Primary Examiner* — William M McCalister
*Assistant Examiner* — Patrick C Williams
(74) *Attorney, Agent, or Firm* — Rabin & Berdo, P.C.

(57) ABSTRACT

A compensator spool of a load sensing valve device includes a pressure chamber, a compensator throttle portion, a pressure introduction chamber, a pressure introduction port, a maximum load pressure introduction chamber, and a selector valve. A groove is formed around the pressure introduction port, and a groove moves relatively between a passage communicating with an actuator to reduce an opening area of the pressure introduction port when the compensator spool moves.

3 Claims, 2 Drawing Sheets ized manner. A first annular groove 9 is formed at the middle of the main spool MS, and a second annular groove 10 and a third annular groove 11 are formed on either side of the first annular groove 9.

LOAD SENSING VALVE DEVICE

TECHNICAL FIELD

The present invention relates to a load sensing valve device.

BACKGROUND ART

JP2009-204086A discloses a load sensing valve device that maintains a flow dividing ratio according to the opening of each main valve, regardless of load pressure variation in a plurality of actuators. Moreover, as a technology related to this type, there is, for example, a load sensing valve device 200 disclosed in FIG. 2.

The load sensing valve device 200 shown in FIG. 2 includes a valve body B that incorporates a main valve V1 and a compensator valve V2. A pump port 1 connected to a variable displacement pump (not illustrated), a bifurcated connection passage 2 leading from the pump port 1, and actuator ports 3 and 4 connected to the actuators, are formed in the valve body B.

A main spool MS of the main valve V1 is provided in the valve body B in a slidable manner. A first annular groove 9 is formed at the middle of the main spool MS, and a second annular groove 10 and a third annular groove 11 are formed on either side of the first annular groove 9.

Moreover, a spool hole for the main spool MS has a first annular recessed portion 12 formed at the center of the connection passage 2, and a second annular recessed portion 13 and a third annular recessed portion 14 formed at positions on respective outer sides of the connection passage 2.

The main spool MS is usually kept in a neutral position as shown in FIG. 2 by an effect of a spring force of a centering spring 15.

When the main spool MS is in the neutral position, the first annular groove 9 directly faces the first annular recessed portion 12, and the second annular groove 10 and the third annular groove 11 directly face the actuator ports 3 and 4, respectively.

When a pilot pressure is guided to one of either the first pilot chamber 16 or the second pilot chamber 17 from a state in which the main spool MS is kept in the neutral position, the main spool MS moves in either of the right or left direction in FIG. 2 and is switched.

The compensator valve V2 is constructed to have a compensator spool CS serve as a main element thereof, the compensator spool CS being incorporated into the valve body B in a slidable manner. The compensator spool CS has an annular first groove 18, second groove 19, and third groove 20 formed thereon. Moreover, one end of the compensator spool CS faces the pressure chamber 21, and the other end thereof faces a maximum load pressure introduction chamber 22.

A passage 23 is formed in the compensator spool CS, which communicates with the pressure chamber 21. An opening portion 23a of the passage 23 communicates with a relay port 24 formed in the valve body B. The opening portion 23a is opened constantly to the relay port 24 regardless of a moved position of the compensator spool CS. Moreover, a damper orifice 23b is formed between the opening portion 23a and the passage 23.

Moreover, the relay port 24 communicates constantly with the first annular recessed portion 12 of the main valve V1. When the main spool MS switches from the neutral position shown in FIG. 2 to either a left or a right position, pressured fluid flows from the pump port 1 into the relay port 24, and the pressure of the relay port 24 is guided to the pressure chamber 21 via the passage 23.

The compensator spool CS is kept at a position in which pressure guided from the relay port 24 to the pressure chamber 21 is balanced with a maximum load pressure guided towards the maximum load pressure introduction chamber 22. Furthermore, the opening of the flow passage flowing from the relay port 24 to the first groove 18, that is, the opening of the compensator throttle portion a, becomes the smallest when the compensator spool CS is at the position shown in FIG. 2, and increases as the compensator spool CS moves in the right direction.

Moreover, a U-shaped flow passage 25 is formed in the valve body B, and one end of the flow passage 25 constantly communicates with the first groove 18 of the compensator spool CS.

Therefore, the pressured fluid flowing into the relay port 24 flows into the flow passage 25 via the compensator throttle portion a. The pressured fluid flowing into the flow passage 25 pushes open either the load check valve 26 or 27. Furthermore, the pressured fluid is guided to either the second annular recessed portion 13 or the third annular recessed portion 14, via either the second groove 19 or the third groove 20.

Moreover, the other end of the flow passage 25 communicates with the first pressure introduction port 28a and the second pressure introduction port 28b, according to the moved position of the compensation spool CS. The first pressure introduction port 28a opens towards the flow passage 25 when the compensator spool CS is in the position as shown in FIG. 2. The compensator spool CS then closes during a course of moving in the right direction in FIG. 2.

The second pressure introduction port 28b is in a substantially fully closed state when the compensator spool CS is in the position as shown in FIG. 2, and when the compensator spool CS moves in the right direction in FIG. 2, the second pressure introduction port 28b communicates with the flow passage 25.

However, an orifice is formed in the second pressure introduction port 28b as shown in FIG. 2, to reduce the opening of the second pressure introduction port 28b than the opening of the first pressure introduction port 28a.

The first pressure introduction port 28a and the second pressure introduction port 28b communicate with a pressure introduction chamber 29 formed in the compensator spool CS.

The pressure introduction chamber 29 faces one end of a selector valve 30. The other end of the selector valve 30 faces a pressure relay chamber 31 that communicates with the maximum load pressure introduction chamber 22.

Therefore, a pressure of the pressure introduction chamber 29, that is to say, a load pressure of an actuator connected to the main valve V1, and a maximum load pressure guided to the maximum load pressure introduction chamber 22, act on the selector valve 30.

When the load pressure of the actuator exceeds the pressure of the maximum load pressure introduction chamber 22 at this time, in other words, when the load pressure of the actuator becomes higher than the load pressure of the other actuators, the selector valve 30 opens by the effect of the load pressure of the actuator, and the load pressure of the actuator is guided to the maximum load pressure introduction chamber 22.

When the load pressure of the actuator is lower than the pressure of the maximum load pressure introduction chamber 22, the selector valve 30 is kept in a closed valve state by the effect of the pressure of the maximum load pressure introduction chamber 22.

As such, a maximum load pressure is selected among the load pressures of the actuators connected to the plurality of main valves, and is introduced to the maximum load pressure introduction chamber 22 of each of the main valves and is guided to a tilt angle control section (not illustrated).

SUMMARY OF INVENTION

In the above device, in order to increase responsiveness of regulators at an initial stage of load variation in actuators and slightly drop the responsiveness after elapse of the initial stage, a second pressure introduction port is formed parallel to a first pressure introduction port, and an orifice is formed in the second pressure introduction port. Formation of the orifice as such generates a difference in opening areas of the pressure introduction ports.

However, in the above device, since the orifice has to be formed inside the second pressure introduction port, this thus makes it difficult to accurately maintain the opening diameter of the orifice, and serves as a cause for an increase in processing costs.

The present invention provides a load sensing valve device that improves responsiveness in tilt angle control of a variable displacement pump at an initial stage of the load variation and drops this responsiveness after elapse of the initial stage, as well as reducing processing costs and facilitating its processing.

According to one aspect of the present invention, a load sensing valve device includes a plurality of valve bodies associated with a plurality of actuators, the plurality of valve bodies including an actuator port configured to guide working fluid to the plurality of actuators, a plurality of main spools each incorporated in a slidable manner into respective ones of the plurality of valve bodies, and a plurality of compensator spools each incorporated in parallel with respect to an axial direction of the plurality of main spools. The compensator spool includes a pressure chamber configured such that working fluid from a variable displacement pump is guided to the pressure chamber in accordance with a switching of the main spool, a compensator throttle portion configured to communicate the pressure chamber with the actuator port, opening of the compensator throttle portion varying in accordance with a moved position, a pressure introduction chamber disposed downstream of the pressure chamber, load pressure of the actuator being configured to be guided to the pressure introduction chamber, a pressure introduction port configured to communicate the pressure introduction chamber with the actuator port, a maximum load pressure introduction chamber configured such that a maximum load pressure is guided among load pressures of the plurality of actuators, and a selector valve facing the pressure introduction chamber at one end and facing the maximum load pressure introduction chamber at the other end, the selector valve being configured to be selecting a higher pressure among a pressure of the pressure introduction chamber and a pressure of the maximum load pressure introduction chamber. A groove is formed around the pressure introduction port, and the groove moves relatively between a passage communicating with the actuator to reduce an opening area of the pressure introduction port when the compensator spool moves.

DESCRIPTION OF EMBODIMENTS

Figure 1:
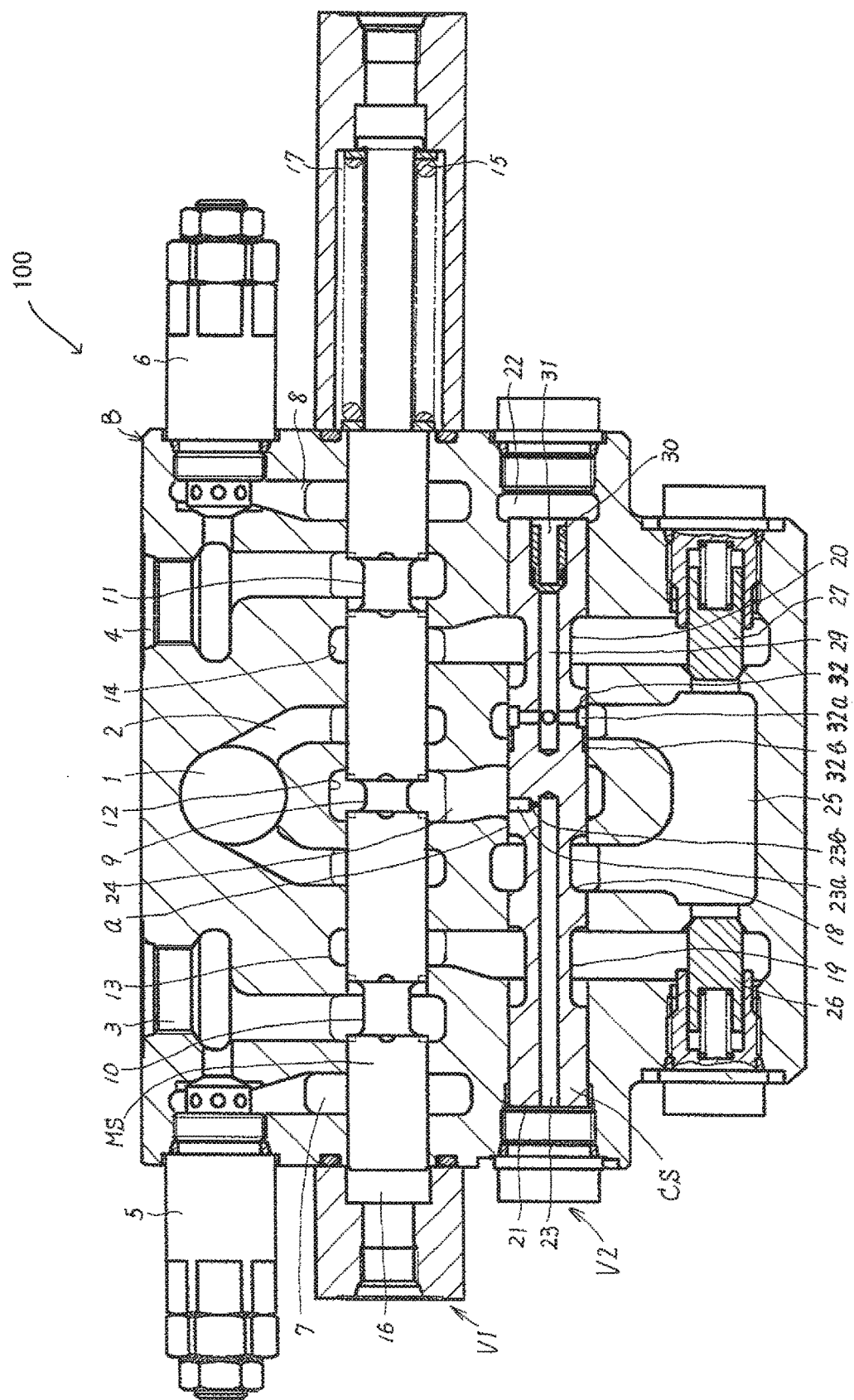
FIG. 1 is a cross sectional view of a load sensing valve device according to an embodiment of the present invention.
Figure 2:
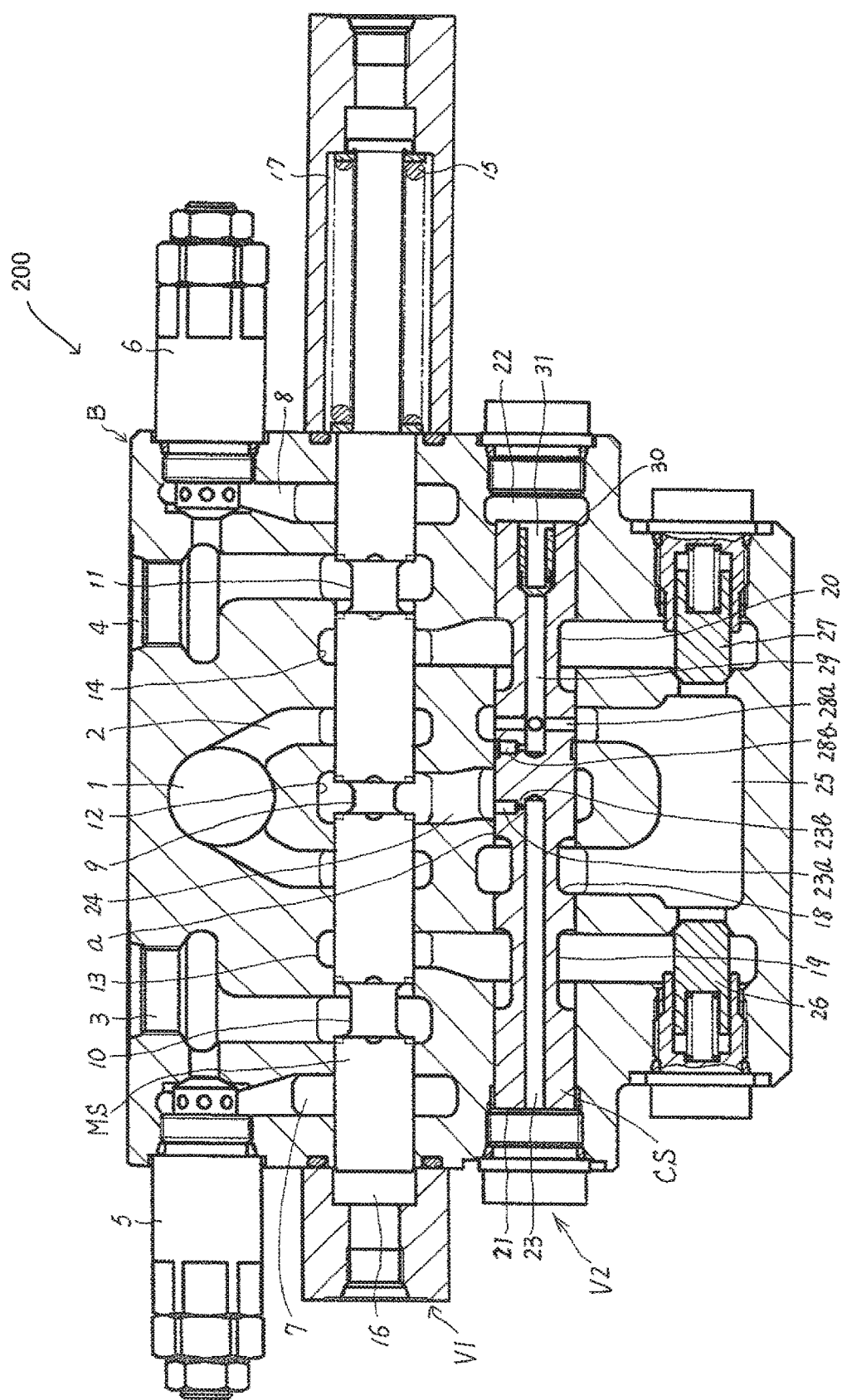
FIG. 2 is a cross sectional view of a load sensing valve according to a related art of the present invention.

The following describes a load sensing valve device 100 according to an embodiment of the present invention, with reference to FIG. 1. For any configurations similar to those of the load sensing valve device 200 shown in FIG. 2, identical reference signs are designated thereto.

The load sensing valve device 100 is used, for example, in construction machines, particularly in power shovels. The load sensing valve device 100 includes a plurality of actuators, and is a device in which a main valve is connected to each of the actuators.

As shown in FIG. 1, the load sensing valve device 100 includes a valve body B that incorporates a main valve V1 and a compensator valve V2. The valve body B configured as including the main valve V1 and the compensator valve V2 as one set as such is provided for each of the plurality of actuators (not illustrated). Moreover, these valve bodies B are usually formed into a manifold.

A pump port 1 connected to a variable displacement pump (not illustrated), a bifurcated connection passage 2 leading from the pump port 1, and actuator ports 3 and 4 connected to the actuators are formed in the valve body B.

The load sensing valve device 100 includes relief valves 5 and 6 to return the working fluid of the actuator ports 3 and 4 back to return passages 7 and 8, when the load pressure on the actuator ports 3 and 4 become equal to or higher than a set pressure.

A main spool MS of the main valve V1 is provided in the valve body B in a slidable manner. A first annular groove 9 is formed at the middle of the main spool MS, and a second annular groove 10 and a third annular groove 11 are formed on either side of the first annular groove 9.

Moreover, a spool hole for the main spool MS has a first annular recessed portion 12 formed at a position centered between the connection passage 2, and a second annular recessed portion 13 and a third annular recessed portion 14 formed at positions on respective outer sides of the connection passage 2.

The main spool MS is usually kept in a neutral position as shown in FIG. 1 by the effect of a spring force of a centering spring 15.

When the main spool MS is in the neutral position, the first annular groove 9 directly faces the first annular recessed portion 12, and the second annular groove 10 and third annular groove 11 directly face the actuator ports 3 and 4, respectively.

When a pilot pressure is guided to one of either the first pilot chamber 16 or the second pilot chamber 17 from a state in which the main spool MS is maintained in the neutral position, the main spool MS moves in either of the right or left direction in FIG. 1 and is switched.

For example, when the main spool MS moves in the right direction in FIG. 1 and is switched, the first annular recessed portion 12 communicates with the connection passage 2 via the first annular groove 9, and the second annular recessed portion 13 communicates with the actuator port 3 via the second annular groove 10. Moreover, the actuator port 4 communicates with the return passage 8 via the third annular groove 11.

On the other hand, when the main spool MS moves in the left direction in FIG. 1 and is switched, the first annular recessed portion 12 communicates with the connection passage 2 via the first annular groove 9, and the third annular recessed portion 14 communicates with the actuator port 4 via the third annular groove 11. Moreover, the actuator port 3 communicates with the return passage 7 via the second annular groove 10.

When the connection passage 2 communicates with the first annular recessed portion 12 via the first annular groove 9, this communicating portion constitutes a variable constricted part of the main valve V1. Therefore, the opening of the variable constricted part is proportional to a moved amount of the main spool MS. Hereinafter, the variable constricted part of the main valve V1 is called a main constricted portion.

The compensator valve V2 is constructed to have a compensator spool CS serve as a main element thereof, the compensator spool CS being incorporated into the valve body B in a slidable manner. The compensator spool CS has an annular first groove 18, second groove 19, and third groove 20 formed thereon.

The second groove 19 and the third groove 20 constantly communicate with the second annular recessed portion 13 and the third annular recessed portion 14, respectively, of the main valve V1.

Moreover, one end of the compensator spool CS faces the pressure chamber 21, and the other end thereof faces a maximum load pressure introduction chamber 22.

A passage 23 is formed in the compensator spool CS, which communicates with the pressure chamber 21. An opening portion 23a of the passage 23 communicates with a relay port 24 formed in the valve body B. The opening portion 23a is opened constantly to the relay port 24 regardless of a moved position of the compensator spool CS. Moreover, a damper orifice 23b is formed between the opening portion 23a and the passage 23.

Moreover, the relay port 24 communicates constantly with the first annular recessed portion 12 of the main valve V1. When the main spool MS switches from the neutral position shown in FIG. 1 to either a left or right position, pressured fluid flows in from the pump port 1 to the relay port 24, and the pressure of the relay port 24 is guided to the pressure chamber 21 via the passage 23.

The compensator spool CS is maintained at a position in which pressure guided from the relay port 24 to the pressure chamber 21 is balanced with a maximum load pressure guided towards the maximum load pressure introduction chamber 22. Furthermore, the opening of the flow passage flowing from the relay port 24 to the first groove 18, that is, the opening of the compensator throttle portion a, becomes the smallest when the compensator spool CS is at the position shown in FIG. 1, and increases as the compensator spool CS moves in the right direction.

Moreover, a U-shaped flow passage 25 is formed in the valve body B, and one end of the flow passage 25 constantly communicates with the first groove 18 of the compensator spool CS.

Therefore, the pressured fluid flowing into the relay port 24 flows into the flow passage 25 via the compensator throttle portion a. The pressured fluid flowing into the flow passage 25 pushes open either of the load check valve 26 or 27. Furthermore, the pressured fluid is guided to either of the second annular recessed portion 13 or the third annular recessed portion 14, via either of the second groove 19 or the third groove 20.

Moreover, the other end of the flow passage 25 communicates with a pressure introduction port 32 in accordance with the moved position of the compensator spool CS. The pressure introduction port 32, in which a large opening 32a and a small opening 32b are integrally provided, when the compensator spool CS is at a position shown in FIG. 1, the large opening 32a is in a fully open state with respect to the flow passage 25. When the compensator spool CS moves in the right direction in FIG. 1, then the large opening 32a closes and the small opening 32b opens, with respect to the flow passage 25.

The small opening 32b can be formed just by processing a groove on an outer circumferential surface of the compensator spool CS, which thus can facilitate the process, and holds down processing costs.

The pressure introduction port 32 communicates with a pressure introduction chamber 29 formed in the compensator spool CS.

One end of a selector valve 30 faces the pressure introduction chamber 29. Moreover, the other end of the selector valve 30 faces a pressure relay chamber 31 that communicates with the maximum load pressure introduction chamber 22.

Therefore, the pressure of the pressure introduction chamber 29, that is to say, a load pressure of the actuator connected to the main valve V1 and a maximum load pressure guided to the maximum load pressure introduction chamber 22, act on the selector valve 30.

When the load pressure of the actuator exceeds the pressure of the maximum load pressure introduction chamber 22 at this time, in other words, when the load pressure of the actuator is higher than the load pressure of the other actuators, the selector valve 30 opens due to the effect of the load pressure of the actuator, and the load pressure of the actuator is guided to the maximum load pressure introduction chamber 22.

When the load pressure of the actuator is lower than the pressure of the maximum load pressure introduction chamber 22, the selector valve 30 is maintained in a closed valve state by the effect of the pressure of the maximum load pressure introduction chamber 22.

As such, a maximum load pressure is selected among the load pressures of the actuators connected to the plurality of main valves, and is introduced to the maximum load pressure introduction chamber 22 of each of the main valves and is guided to a tilt angle control section (not illustrated).

Next describes the effect of the present embodiment.

For example, when the main spool MS is switched from the neutral position shown in FIG. 1 to the right direction, the actuator port 3 communicates with the second annular recessed portion 13 of the main valve V1 via the second annular groove 10 of the main spool MS.

Moreover, the actuator port 4 communicates with the return passage 8 via the third annular groove 11 of the main spool MS.

At this time, the first annular recessed portion 12 communicates with the connection passage 2 via the first annular groove 9 of the main spool MS; thus, the pressure fluid flowing into the pump port 1 flows into the relay port 24. The pressure of the pressure fluid flowing into the relay port 24 becomes lower than pump discharging pressure by the amount of pressure loss in accordance with the opening of the main constricted portion.

As such, the pressure of the pressure fluid flowing into the relay port 24 is guided to the pressure chamber 21 via the opening portion 23a and the damper orifice 23b.

By the pressure on the relay port 24 side being guided to the pressure chamber 21, the pressure of the pressure chamber 21 effects one end of the compensator spool CS, and the maximum load pressure guided to the maximum load pressure introduction chamber 22 effects the other end of the compensator spool CS.

The opening of the compensator throttle portion a is determined based on the position of the compensator spool CS. The position of the compensator spool CS is further determined by a pressure balance between the pressure of the relay port 24 side guided toward the pressure chamber 21 and a maximum load pressure guided to the maximum load pressure introduction chamber 22.

Moreover, the pressured working fluid guided to the flow passage 25 pushes open the load check valve 26, is guided to the second annular recessed portion 13 of the main valve V1, and is supplied to the actuator port 3 via the second annular groove 10 of the main spool MS.

Therefore, the pressure within the flow passage 25 becomes the load pressure of the actuator that is connected to the main valve V1.

The return fluid of the actuator is returned from the actuator port 4 to the return passage 8, through the third annular groove 11 of the main spool MS.

On the other hand, the pressure of the flow passage 25, that is to say, the load pressure of the actuator, is guided from the pressure introduction port 32 to the pressure introduction chamber 29. Therefore, when the maximum load pressure guided to the maximum load pressure introduction chamber 22 is higher upon comparison between the pressure of the pressure introduction chamber 29 and the maximum load pressure guided to the maximum load pressure introduction chamber 22, the selector valve 30 maintains a closed valve state, and the compensator spool CS maintains its current position, that is to say, the aforementioned balanced position.

Moreover, when the load pressure of the actuator connected to the main valve V1 increases in a state in which the main valve V1 is maintained in a predetermined switched position, the pressure of the pressure chamber 21 increases together with that increase.

At this time, the compensator spool CS moves in the right direction in FIG. 1 by a pressure effect of the increased pressure chamber 21 and a pressure effect of the maximum load pressure guided to the maximum load pressure introduction chamber 22, and the opening of the compensator throttle portion a increases.

When the opening of the compensator throttle portion a increases, the pressure loss in the front and rear of the compensator throttle portion a decreases. Hence, the differential pressure in the front and rear of the main constricted portion is kept constant. When the front and rear differential pressure of the main constricted portion is kept constant, the amount of flow that passes through the main constricted portion will not change even if the load pressure of the actuator increases. In other words, the flow dividing ratio according to the opening of the plurality of main valves will be kept constant regardless of the load pressure of the actuator connected to each of the main valves.

Moreover, when the load pressure of the actuator connected to the main valve V1 decreases in a state in which the main valve V1 is maintained at the predetermined switching position, the pressure of the pressure chamber 21 decreases in response.

At this time, the compensator spool CS moves in a left direction in FIG. 1 due to a decreased pressure effect of the pressure chamber 21 and a pressure effect of the maximum load pressure guided to the maximum load pressure introduction chamber 22, and the opening of the compensator throttle portion a decreases.

When the opening of the compensator throttle portion a decreases, the pressure loss in the front and rear of the compensator throttle portion a increases. Hence, the differential pressure in the front and rear of the main constricted portion is kept constant. When the front and rear differential pressures of the main constricted portion is kept constant, the amount of flow passing through the main constricted portion will not change, and the flow dividing ratio in accordance with the opening of the plurality of main valves is kept constant as described above, regardless of the load pressure of the actuator connected to the main valves V1.

The maximum load pressure guided to the maximum load pressure introduction chamber 22 is guided to the tilt angle control section, and the variable displacement pump is controlled by the tilt angle control section to a tilt angle in accordance with the maximum load pressure.

Moreover, in the pressure introduction port 32 of the present embodiment, the opening with respect to the flow passage 25 changes in accordance with a moved position of the compensator spool CS.

When the compensator spool CS is in the state of FIG. 1, the compensator spool CS is in full stroke towards the pressure chamber 21, Thus, the load pressure of the actuator connected to the main valve V1 is lower than the load pressure of the other actuators.

When the load pressure of the actuator increases from this state and the pressure of the pressure chamber 21 exceeds the maximum load pressure guided to the maximum load pressure introduction chamber 22, the compensator spool CS moves in response in the right direction of FIG. 1.

As such, in an initial stage of the movement of the compensator spool CS, the large opening 32a of the pressure introduction port 32 is opened to its maximum. Therefore, in the initial stage where the maximum load pressure is reversed, the tilt angle control section responses rapidly.

Furthermore, when the compensator spool CS moves by a predetermined amount, the opening of the large opening 32a of the pressure introduction port 32 decreases with respect to the flow passage 25. This causes the opening of the pressure introduction port 32 to become an opening of the small opening 32b, from the opening of the large opening 32a. That is to say, the area of the opening decreases when the compensator spool CS moving towards the maximum load pressure introduction chamber, which thus decreases the gain of the tilt angle control by the tilt angle control section, and hence allows for stable control by the reduction of the gain.

As described above, according to the present embodiment, the small opening 32b can be formed just by processing a groove on the outer circumferential surface of the compensator spool CS. Therefore, there is no need to form the second pressure introduction port in the compensator spool CS and to process the orifice for maintaining the diameter of the opening accurate. Accordingly, the processing of the compensator spool CS is facilitated, and thus reduces the processing costs.

The embodiments of the present invention described above are merely illustration of some application examples of the present invention and not of the nature to limit the technical scope of the present invention to the specific constructions of the above embodiments.

For example, in the above embodiment, a groove is formed around the pressure introduction port 32, and the size of the substantial opening with respect to the flow passage 25 of the pressure introduction port 32 becomes small when the groove moves relatively with the flow passage 25. However, a plurality of small holes may be formed instead of the groove, and the opening of the pressure introduction port 32 may be reduced in accordance with the total opening of these small holes.

The present application claims a priority based on Japanese Patent Application No. 2014-227154 filed with the Japan Patent Office on Nov. 7, 2014, all the contents of which are hereby incorporated by reference.

The invention claimed is:

1. A load sensing valve device comprising:
a plurality of valve bodies associated with a plurality of actuators, the plurality of valve bodies including an actuator port configured to guide working fluid to the plurality of actuators;
a plurality of main spools each incorporated in a slidable manner into respective ones of the plurality of valve bodies; and
a plurality of compensator spools each incorporated in parallel with respect to an axial direction of the plurality of main spools, the compensator spool comprising
a pressure chamber configured such that working fluid from a variable displacement pump is guided to the pressure chamber in accordance with a switching of the main spool,
a compensator throttle portion configured to communicate the pressure chamber with the actuator port, opening of the compensator throttle portion varying in accordance with a moved position,
a pressure introduction chamber disposed downstream of the pressure chamber, load pressure of the actuator being configured to be guided to the pressure introduction chamber,
a pressure introduction port configured to communicate the pressure introduction chamber with the actuator port,
a maximum load pressure introduction chamber configured such that a maximum load pressure is guided among load pressures of the plurality of actuators, and
a selector valve facing the pressure introduction chamber at one end and facing the maximum load pressure introduction chamber at the other end, the selector valve being configured to be selecting a higher pressure among a pressure of the pressure introduction chamber and a pressure of the maximum load pressure introduction chamber,
wherein the pressure introduction port comprises a large opening and a small opening, the large opening comprising a first groove on an outer circumferential surface of the compensator spool and the small opening comprising a second groove on the outer circumferential surface of the compensator spool,
wherein the small opening is located adjacent to the large opening in an axial direction of the compensator spool such that the small opening communicates with the large opening, and
wherein the large opening and the small opening are positioned on the outer circumference of the compensator spool such that when the compensator spool is in a first axial position, the large opening is spaced apart from a passage communicating with the actuator port in the axial direction while the small opening is located radially inward of the passage communicating with the actuator port.

2. The load sensing valve device of claim 1, wherein a depth of the large opening in a radial direction of the compensator spool is greater than a depth of the small opening in the radial direction of the compensator spool.

3. The load sensing valve device of claim 1, wherein the small opening has a smaller opening area than an opening area of the large opening.

* * * * *